Figure 7:
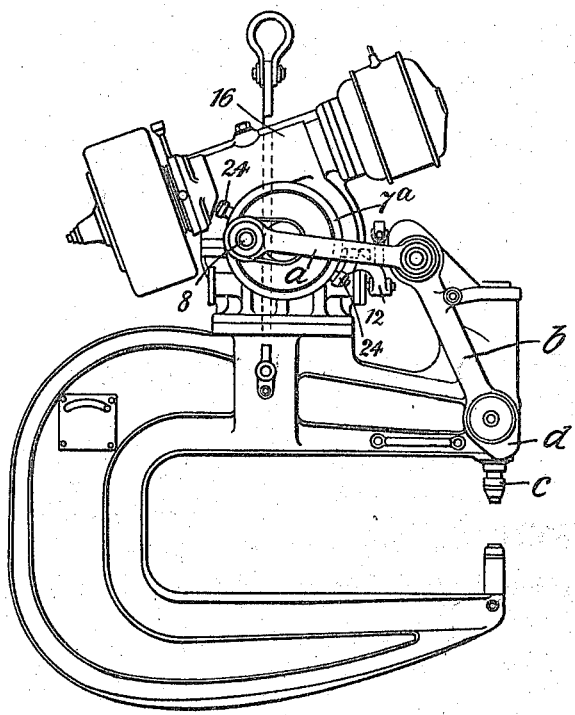

R. JAY.
CLUTCH ACTUATING MECHANISM FOR RIVETING MACHINES.
APPLICATION FILED JAN. 29, 1913.
1,137,058.
Patented Apr. 27, 1915.
2 SHEETS—SHEET 1.
Fig. 1.
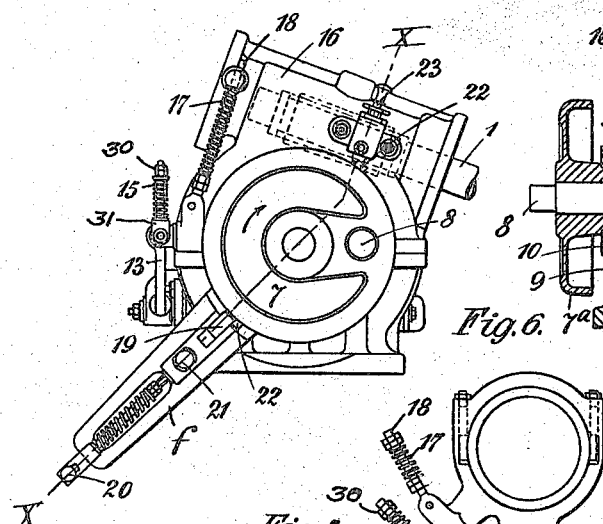
Fig. 2.
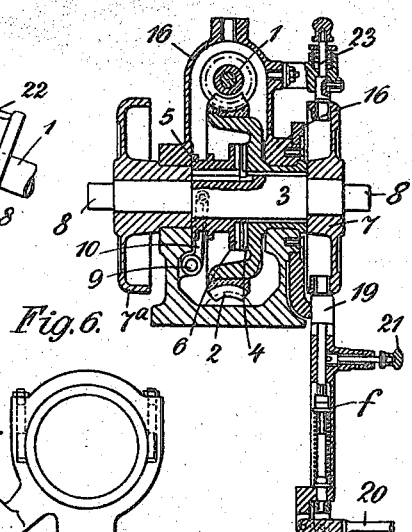
Fig. 6.
Fig. 5.
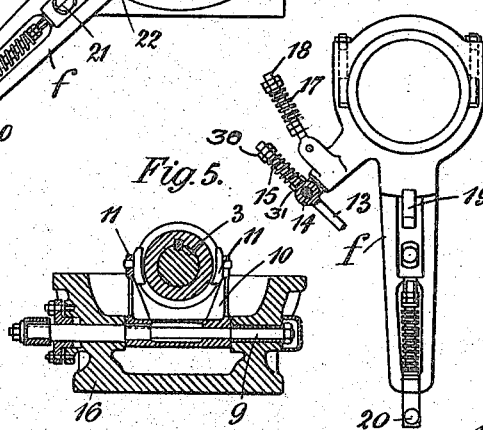
Fig. 3.
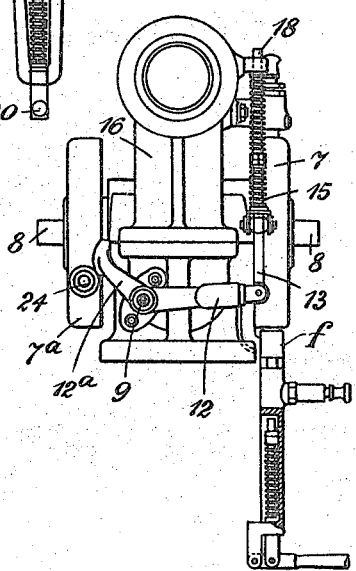
Fig. 4.
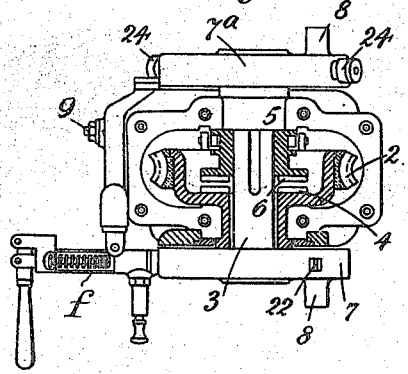
WITNESSES
U. S. J. Dunbar
H. E. Bready.
INVENTOR
Rudolf Jay
Cary H. Moore
attorney

UNITED STATES PATENT OFFICE.

RUDOLF JAY, OF LEIPZIG, GERMANY, ASSIGNOR TO LEIPZIGER MASCHINENBAU-GESELLSCHAFT M. B. H., OF LEIPZIG-SELLERHAUSEN, GERMANY.

CLUTCH-ACTUATING MECHANISM FOR RIVETING-MACHINES.

1,137,058. Specification of Letters Patent. Patented Apr. 27, 1915.

Application filed January 29, 1913. Serial No. 744,929.

*To all whom it may concern:*

Be it known that I, RUDOLF JAY, subject of the German Emperor, residing at 5 Karl-Tauchnitz strasse, Leipzig, Germany, have invented certain new and useful Improvements in Clutch-Actuating Mechanism for Riveting-Machines, of which the following is a specification.

Ordinarily electrically driven riveting machines, in which the link mechanism is actuated by means of a worm and a worm wheel, are provided with a claw coupling between worm wheel and crank shaft in addition to the switch for the motor. The claw coupling alone is not however sufficient for insuring a stopping period of the die remaining under pressure on the rivet until the rivet has become cold. If the link mechanism is straightened that is if the crank is in its dead center position, the workman has to release the claw coupling, and after the cooling of the rivet to engage the coupling again for the return stroke of the die. On the completion of the return stroke of the die or in the other dead center position of the crank, the link mechanism must again be thrown out of gear in order to allow of the insertion of the rivet. Thus, the coupling must be connected and disconnected twice for each rivet set.

Whereas it is usual for overcoming the aforesaid difficulties to employ an electromagnet coupling and electric controlling system, the present invention relates to an automatic controlling apparatus, wherein only mechanical means are employed for the timely control of the connection and disconnection of the crank disk drive. The mechanism to be employed in connection with an ordinary claw coupling is such that for connecting the coupling, the workman attending to the machine need only release a pawl, whereupon the connection of the coupling, takes place automatically. The uncoupling subsequently takes place again automatically in the dead center position while a stop of the crank disk returns the parts to the initial position. By means of this new controlling mechanism, the attendance of the machine is very simple and absolutely reliable for the function thereof.

A constructional form of the improved controlling mechanism in a riveting machine is shown by way of example in different elevations in the accompanying drawing.

Figure 1 is a side elevation of that part of the mechanism which embodies the invention, Fig. 2 is a section taken on the line $x$—$x$ of Fig. 1, Fig. 3 is a front elevation of the riveting machine gear with control, Fig. 4 is a plan, the upper half of the casing not being shown and the worm wheel shown in section, Fig. 5 is a vertical section showing the fork shaft of the coupling device mounted in the lower casing, Fig. 6 shows the controlling pawl carrying member in a detail view and Fig. 7 shows the side elevation of the whole riveting machine, as seen from the side of the crank disk, reverse to Fig. 1, the said disk being provided with the rollers mounted thereon and serving for the positive uncoupling of the claw coupling.

The general construction of the riveting machine is shown in Fig. 7, in which, however, with the exception of the stops 24 and the rocking lever 12, no essential parts of the hereinafter described new mechanism are to be seen.

The crank disk 7$^a$, which corresponds to the crank disk 7 on the opposite side (Figs. 1, 2 and 3) carries like the latter a crank pin 8 to which the arm $a$ is connected, which forms one member of the pair of connected actuating arms $a$ $b$. Owing to the actuating mechanism engaging with the movable die $c$, the riveting die is expressed by a cam $d$ in the usual manner.

According to the construction shown, the drive is assumed as being derived from an electric motor $e$. The shaft 1 (Fig. 1) can also be rotated by belt gear or another motor. The shaft 1 bears a sleeve having a worm thereon adapted to engage with the worm wheel 2, which is loosely and rotatably mounted on the crank disk shaft 3 and forms one part of a coupling having the coupling claws 4. The axially slidable sleeve 5 provided with the claws 6 forms the other half of the coupling. The two crank disks 7 and 7$^a$ with their crank pins 8 are rigidly mounted on the crank shaft 3, which operates by means of connecting rods the well known actuating mechanism, which is shown in Fig. 7 of the drawing. The shaft 9 of the coupling lever (Fig. 5) carries a fork 10, on whose shank ends are mounted the slide blocks 11, which engage in the groove of the coupling sleeve 5. This disconnecting device is known *per se*, while the controlling arrangement for the automatic connection and disconnection is new.

There is mounted on the shaft 9 a two armed lever 12 (Fig. 3), whose one end is connected by a rod 13 to the controlling member shown in Fig. 6. The linked rod 13 has an elongated hole for receiving the bolt 14 secured to the controlling member. A spring 15 is mounted about the extended end of the rod 13 acting between a nut 30 on the end of the rod and a stool 31 mounted on the pivot shaft 14. The connection between the linked rod 13 and the bolt 14 is not rigid but elastic in a certain sense.

The controlling switch device $f$, as shown in Fig. 6, is a member pivotally mounted on the bearing hub of the worm wheel casing 16, being in a measure interposed between casing and the crank disk 7, said hub being encircled by a collar similar to an eccentric ring. There is provided between the worm wheel casing 16 and the controlling member, a pressure spring 17 which is mounted on a guide 18 and bears against a boss on the casing 16 and a nut on the guide 18. The controlling member has also the pawl 19, which can be lifted by means of a handle 20. The stop 21 serves, when desired, for arresting the pawl 19 in its raised position, having a member 21' adapted to engage a cut out portion 19' on the pawl 19. On the crank disk 7 are mounted the stops 22 against which bear the pawl 19 and the stop 23 secured to the worm wheel casing 16. Two oppositely situated rollers 24 are mounted on the crank disk $7^a$.

The operation of the herein described mechanism is as follows: When working, the worm and worm wheel 2 are in constant rotation. If the coupling 4—5 and 6 provided between the worm wheel 2 and crank shaft 3 is to be thrown into gear or connected, the pawl 19 is raised by means of the handle 20 to such an extent that the pawl can slide over the stop 22. After the pawl 19 is raised, the pressure spring 17 acts and causes the controlling member $f$ to shift on its bearing. Through this rotation, however, the lever 12 and the clutch operating shaft 9 with the coupling fork 10 are rocked by means of the linked rod 13, so that at the proper time the claws 6 and sleeve 5 engage with the claws 4 of the worm wheel 2. The crank shaft with the two crank disks now participate in the rotation of the worm wheel. The action of the spring 17 is not complete as the coupling claws only partially intermesh, and to complete this engagement the cams 24 on the crank disk $7^a$ and the projecting lever arm $12^a$ forming a tail of the lever 12 have been provided. The cam 24 moving from the lever arm $12^a$ imparts a further motion to the lever 12 until parts of the clutch thoroughly engage. This latter arrangement forms a very important point or feature of the new construction, because it insures the connection of the coupling. After the crank disk has made a half revolution, the stop 22 bears against the pawl 19 and positively returns the controlling member to its initial position. By this movement, however, the coupling is again thrown out of gear *i. e.* released by means of the rod 13, lever 12, reversing shaft 9 and the disengaging fork mounted thereon. In order, however, to render the releasing of the coupling complete so that a few millimeters of play or clearance remain between the front faces of the claws *i. e.* that the front faces of the claws of both halves of the coupling do not slide on each other and cannot effect by friction an unintentional rotation of the crank mechanism, the elastic connection between the rod 13 and the controlling member $f$ has been provided. If the controlling member $f$ is carried into its original position by the crank disk, the spring 15 will be slightly tensioned and after the disengagement of the coupling, the said tension will be sufficient for permitting the coupling sleeve to be drawn back to the extent of about 1—2 mm. Besides the arrangement for automatic disconnection, the arrangement of an elastic intermediate member with play or clearance at 14 for effecting an absolutely reliable disconnection forms an essential feature within the scope of the present invention. Simultaneously with the aforesaid disconnection, the spring 17 is also tensioned again, so that it is only necessary to lift the pawl 19 for connecting the mechanism again. The index 23 mounted on the worm wheel casing is adapted to secure the crank mechanism—with which the usual mechanism engages—in its actual dead center position, because in the case of a varied suspension of the machine, the weights of the toggle joint mechanism might also effect a rotation of the crank disk without the coupling being connected or in engagement. The whole arrangement is such that the connection and disconnection of the coupling and the stoppage of the crank disk can only take place in the two dead center positions of the crank disk. There are thus four points, which constitute the advantages of the new construction: Dispensing with the skill of the workman for the attendance of the machine, as the workman need only release the pawl 19. As the worm wheel *i. e.* one half of the coupling is in constant rotation, the coupling is automatically connected at the proper moment, so that the members of the coupling completely intermesh, thus preventing wear and tear of the coupling jaws in consequence of incomplete connection. An automatic disconnection also takes place exclusively in the two dead center positions, thereby insuring an absolutely reliable disconnection and preventing the front faces of the coupling jaws from sliding on one another. Finally, it is possible to secure the crank disks and the toggle joint mechanism in the positions of rest by the stop 23.

Having now particularly described and ascertained the nature of my said invention and in what manner the same is to be performed, I declare that what I claim and wish to secure by Letters Patent is:

1. In a controlling mechanism for power-driven riveting machines the combination with a shaft of a two part clutch mounted thereon one of the parts of said clutch being keyed to said shaft, the parts of said clutch being normally disengaged a spring adapted to cause the parts of said clutch to partially engage and cam means for insuring the completion of said engagement as and for the purpose described.

2. In a controlling mechanism for power driven riveting machines a casing a shaft within said casing and having an end protruding therethrough a two part clutch mounted on said shaft, means for rotating one part of said clutch freely about said shaft, the other member of said clutch being feathered to the shaft and adapted to shift longitudinally thereon, a lever for shifting said feathered member of the clutch into and out of engagement with the rotatable member thereof, a crank disk mounted on the protruding end of said shaft, a controlling member, spring means for shifting said controlling member, means connecting the clutch operating lever with the controlling member whereby the shifting of said controlling member by said spring causes the parts of said clutch to engage and automatic means for returning the controlling member to its normal position against the action of said spring.

3. In a controlling mechanism for power-driven riveting machines the combination with a shaft of a two part clutch mounted thereon one of the parts of said clutch being keyed to said shaft, the parts of said clutch being normally disengaged a spring adapted to cause the parts of said clutch to partially engage, and cam means for insuring the completion of said engagement said cam means operating after the operation of said spring, as and for the purpose described.

In testimony whereof I affix my signature in presence of two witnesses.

RUDOLF JAY.

Witnesses:
   Rudolph Fricke,
   Doris Krahl.